W. H. WINEMAN.
UNLOADING APPARATUS FOR COMPRESSORS.
APPLICATION FILED JAN. 12, 1915.

1,394,802.

Patented Oct. 25, 1921.
6 SHEETS—SHEET 4.

UNITED STATES PATENT OFFICE.

WADE H. WINEMAN, OF CHICAGO, ILLINOIS, ASSIGNOR TO SULLIVAN MACHINERY COMPANY, OF BOSTON, MASSACHUSETTS, A CORPORATION OF MASSACHUSETTS.

UNLOADING APPARATUS FOR COMPRESSORS.

1,394,802.  Specification of Letters Patent. Patented Oct. 25, 1921.

Application filed January 12, 1915. Serial No. 1,875.

*To all whom it may concern:*

Be it known that I, WADE H. WINEMAN, a citizen of the United States, and a resident of Chicago, county of Cook, State of Illinois, whose post-office address is 5437 Gladys avenue, Chicago, Illinois, have invented an Improvement in Unloading Apparatus for Compressors, of which the following description, in connection with the accompanying drawings, is a specification, like characters on the drawings representing like parts.

This invention relates to unloading apparatus for compressors, and more particularly, though not exclusively, to such devices as are employed in compressors of the steam-driven type.

My invention will be best understood by reference to the following description, when taken in connection with the accompanying drawings of one specific embodiment thereof, while its scope will be more particularly pointed out in the appended claims.

Referring to the drawings.

Figure 1:
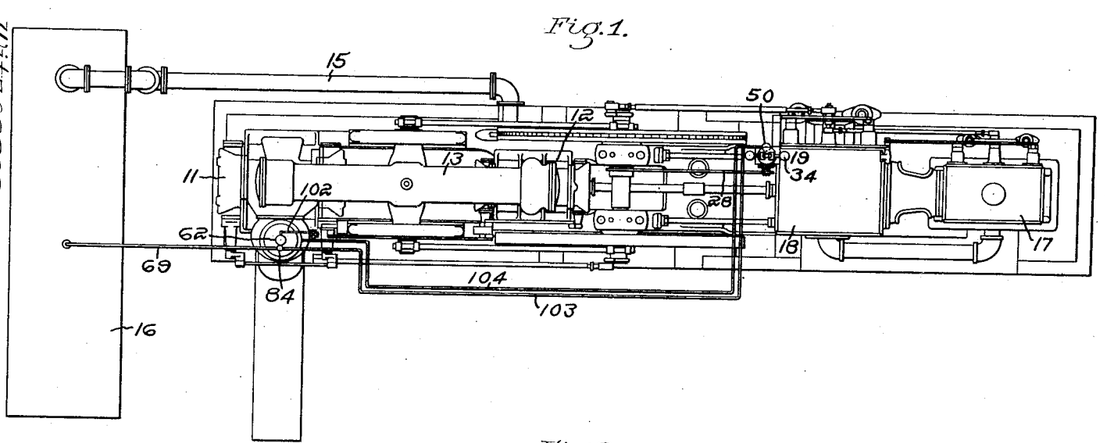
Figure 1 is a plan of a steam-driven compressor equipped with an unloading apparatus embodying my invention.
Figure 2:
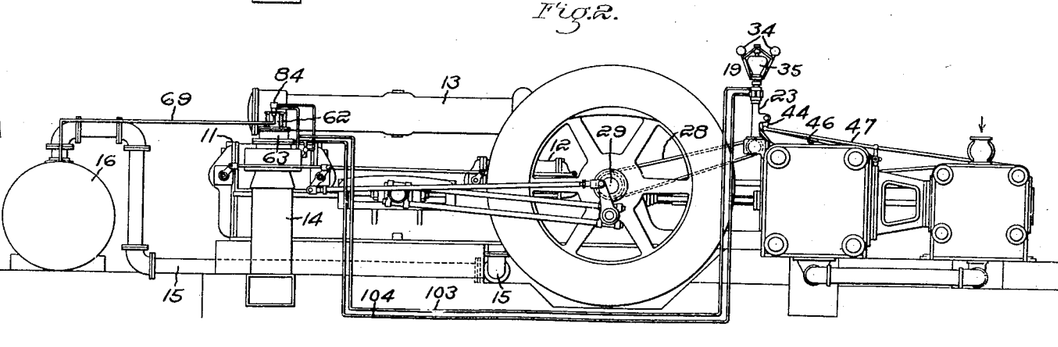
Fig. 2 is a side elevation of the same.
Figure 3:
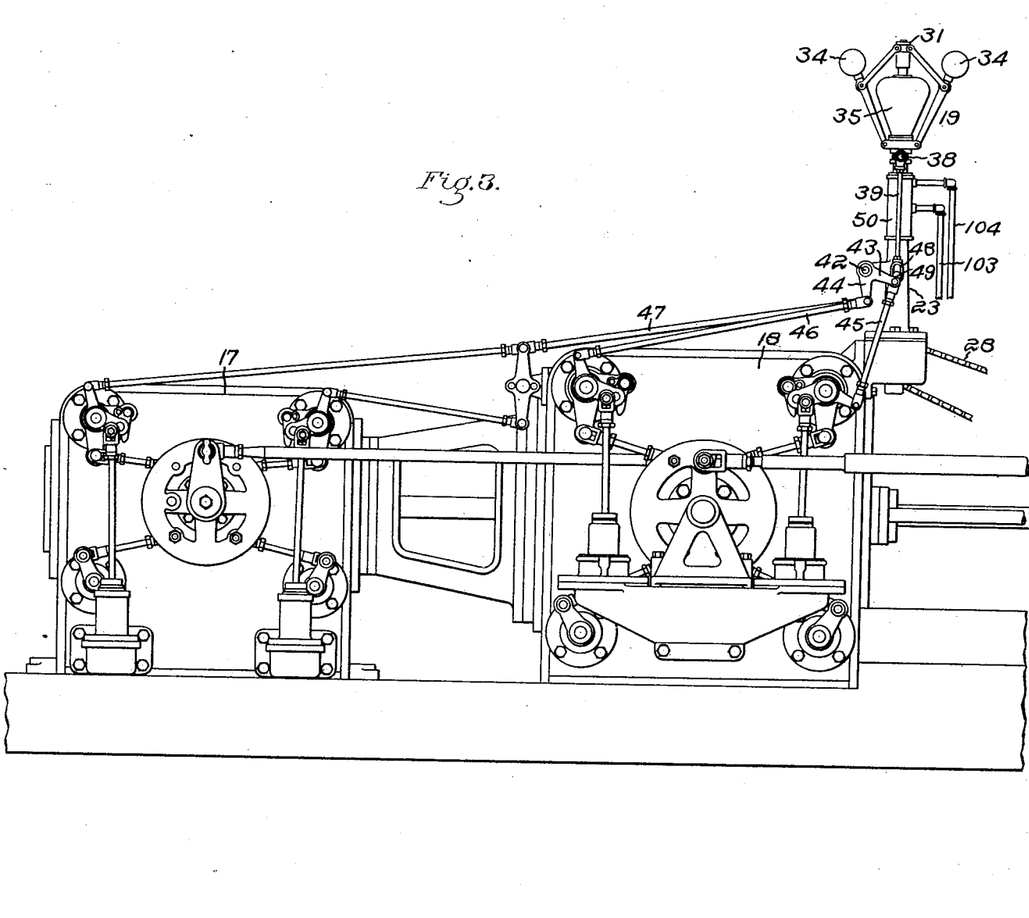
Fig. 3 is an elevation on a somewhat enlarged scale of the steam end of the compressor as viewed from the side opposite to that shown in Fig. 2.

Referring to the drawings, and to the embodiment of my invention which I have selected for illustration, I have there shown a compressor (see Figs. 1 and 2) having a low pressure cylinder 11, and a high pressure cylinder 12, connected as usual by an inter-cooler 13. The low pressure cylinder takes its supply from an intake pipe 14, and compresses the air, which is then delivered through the intercooler to the high pressure cylinder, whence it passes through a discharge pipe 15 to a suitable receiver 16. All of these parts may be of any usual or desired construction. The compressor may be driven by any appropriate motor having suitable governing or controlling means, but that which I have herein shown is a steam engine of the tandem compound type, (see Figs. 1, 2 and 3) having high and low pressure cylinders 17 and 18, whose pistons are direct connected to the compressor in a wellknown manner, which it will be unnecessary here to describe.

Figure 10:
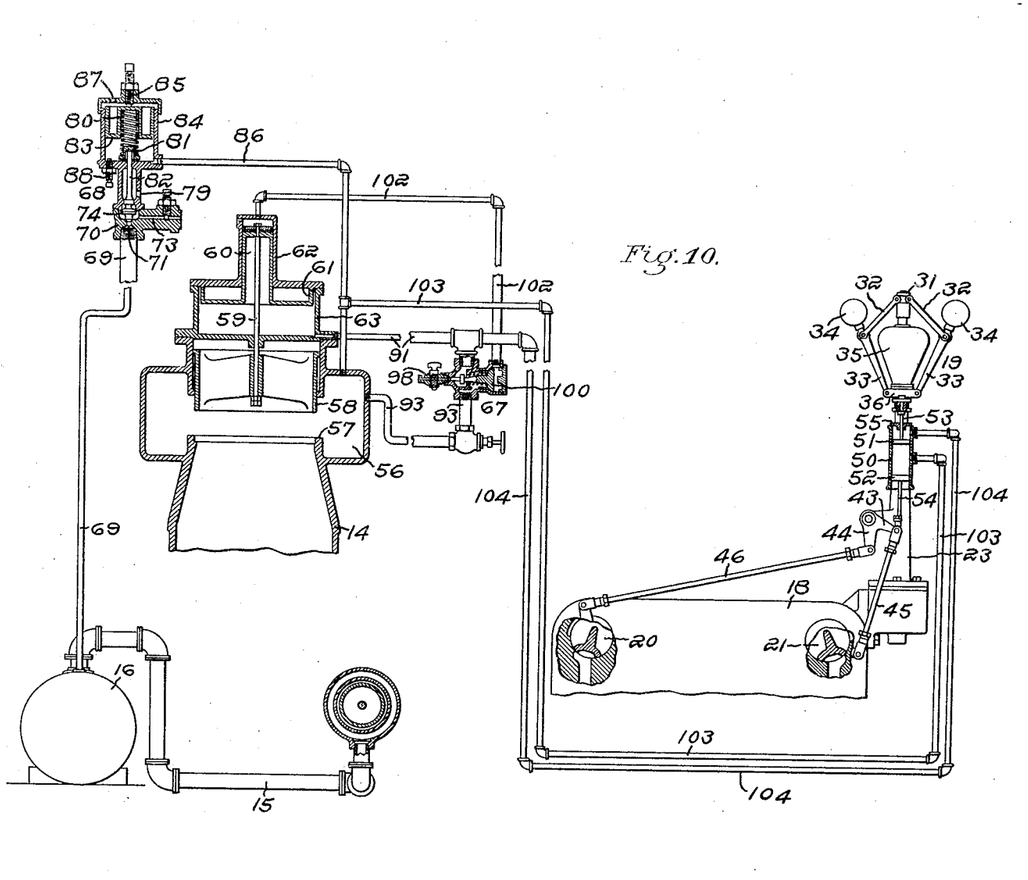
Fig. 10 is a diagrammatic view of the entire unloading apparatus, the relative scale and locations of the various parts, however, being changed for convenience and clearness of illustration.

As herein shown, the engine is of the wellknown Corliss type, having usual valve-actuating mechanism, with a cut-off operated by a governor 19, (see Figs. 1, 2, 3, 6, 7 and 10) of usual and wellknown construction, the connections to the valves, however, being herein modified to permit the unloading apparatus which forms the subject matter of this invention to control the cut-off, as well as to modify the action of the governor, all of which will presently appear. The valves and their cut-off mechanism being wellknown require no further description. However, for the purpose of indicating the general characteristics of the valves, I have shown in Fig. 10 portions of the low pressure cylinder broken away to expose two of its valves 20 and 21, both of which are shown in section with the ports which they control. The valve-actuating mechanism is well shown in Fig. 3.

The governor, which as already indicated may be of any usual or suitable construction, (see Figs. 6 and 7) herein comprises a vertical shaft 22, journaled in an upright standard 23, and driven as usual by miter gears 24 and 25, the latter being secured to a shaft 26, to which is also secured a sprocket wheel 27, connected by a chain 28 (see Figs. 1 and 2) to the engine crank shaft 29. The shaft 22, which is keyed to the miter gear 24, extends upwardly through a sleeve 30, and to its upper end is secured a collar 31 connected by links 32 to levers 33 provided with ball weights 34, and fulcrumed on a collar 36, the latter rotatably mounted on the sleeve 30. A spring 37, encircling the shaft and bearing at its upper end against the collar 31, and at its lower end against a weight 35, exerts a downward thrust on the latter, and tends to hold the governor weight, and the sleeve, in their lowermost position. When, however, the speed reaches a predetermined number of rotations per minute, the governor balls, by centrifugal action, cause the sleeve to be lifted. The latter is herein provided with a cross-head 38, connected by a link 39 to one arm 40 of a rocking member 41, the latter being mounted on a stud 42, secured to the standard 23. This rocking member is also provided with arms 43 and 44, connected by links 45, 46 and 47, to the cut-off mechanisms of the high and low pressure cylinders of the engine. The governor and the mechanism by which it is connected to control the cut-off of the valves may be, and herein are, of a wellknown type of construction. The link 39, however, is herein modified by providing its lower terminal portion with a slot 48, in which is located a pin or stud 49, the latter being secured to the arm 40, whereby a lost motion connection is provided between the arm and the governor for a purpose which will presently appear.

Secured in fixed position to the governor standard 23 is a cylinder 50, (see Figs. 6 and 7) having therein pistons 51 and 52, arranged in spaced relation within the cylinder, and connected, the one by a piston rod 53 to the cross-head 38, and the other by a piston rod 54 to the stud 49 of the arm 40. The upper end of the cylinder 50 is closed by a cylinder head 55, thus forming above the piston 51 a closed chamber, while the lower end of the cylinder is entirely open to the atmosphere. Between the two pistons there is formed a chamber from which the air is exhausted, as will presently appear.

Turning now to the compressor, the low pressure cylinder of the latter is provided with an intake chamber 56, (see Figs. 4 and 5), which it will be convenient herein to refer to as the intake. Within this intake is a valve seat 57, through which air is admitted from the intake pipe 14 to the low pressure cylinder. This valve seat is controlled by a valve 58, of the hollow piston type, provided with a valve stem 59.

The valve stem extends upwardly from the valve, and is secured at its upper end to a piston member comprising a piston 60, and a piston 61. The piston 60 works in a cylinder 62, while the piston 61 works in a cylinder 63. A pair of springs 64 (see Fig. 4), secured at their lower ends to hooks 65 provided on the piston 61 and at their upper ends to a pair of lugs 66 provided on the exterior of the cylinder 62, constantly tend to lift the valve 58 from its seat 57, and maintain the intake open. The valve is closed against the tension of these springs by supplying air under pressure to the cylinder chamber above the piston 60, and held closed by exhausting the air from the cylinder chamber beneath the piston 61.

The pistons 61 and 60 are subject to the conjoint control of a pressure fluid controlling device 67 (see Fig. 9), and an "air trigger" 68 (see Fig. 8), the latter forming a part of the subject matter of my application for unloading devices for air compressors, Serial No. 773,745. This air trigger is controlled by the terminal pressure in the receiver, to which it is connected by a pipe 69. The latter is connected to the valve casing 70, within which it communicates with an orifice 71, the latter being controlled by an unloader controlling valve 72, whose under side is subject to receiver or terminal pressure. When this valve is lifted, pressure fluid at the receiver pressure flows through a conduit 73 to the cylinder 62, thereby depressing the piston 60, and causing the intake valve 58 to be closed.

Figures 8, 9:
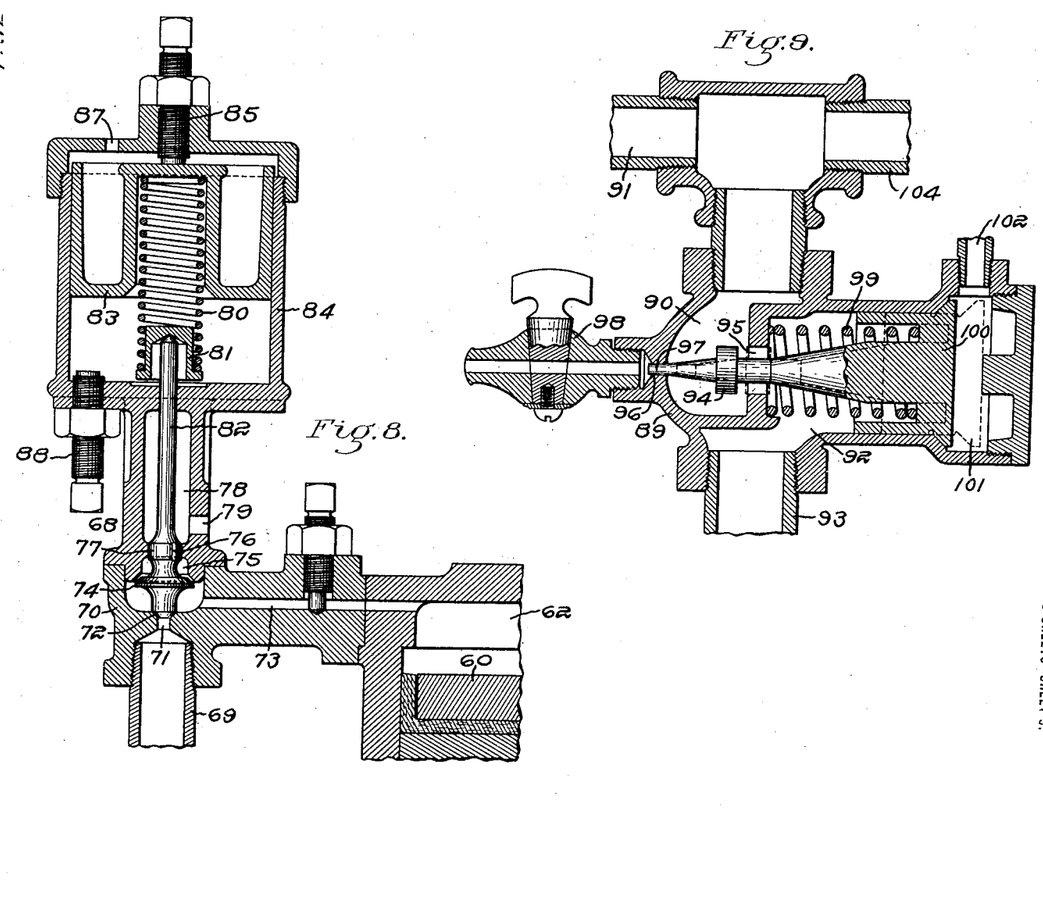
Fig. 8 is a vertical, sectional view on a much enlarged scale, of the "air trigger", which forms a part of the unloading system.
Fig. 9 is a vertical, sectional view, also on an enlarged scale, of the pressure-actuator, or controller.

Connected to, and herein formed integral with the valve 72, is a valve 74, of relatively greater diameter, and which, when elevated, closes an escape orifice 75. When this valve is depressed, pressure fluid is permitted to escape from the cylinder 62 through the conduit 73 and orifice 75, and through grooves 76 in the periphery of a piston 77 to an escape chamber 78, whence it passes through an opening 79 to the atmosphere. The valve 72 is normally seated, and the orifice 71 closed by a spring 80 interposed between a cap piece 81 on a valve stem 82 and a piston 83, the latter being slidably mounted in a piston chamber or cylinder 84. The downward pressure exerted by the spring 80 may be varied by adjusting the position of the piston 83 by means of an adjustable stop screw 85.

When the terminal pressure reaches the predetermined point at which the compressor is intended to unload, the pressure of the air at the orifice 71, acting on the bottom of the valve 72, will lift the latter against the pressure of the spring 80, thus allowing air at terminal pressure to pass through said orifice and the conduit 73 to the piston chamber 62 at the top of the piston 60. Simultaneously therewith, the valve 74 is lifted against its seat, cutting off the atmospheric vent opening 79 from the conduit 73. This acts to unload the low pressure cylinder, by depressing the unloading valve 58 and throttling the low pressure suction. The upper valve 74 is of greater diameter than the lower valve 72, so that the upper valve will continue to be held against its seat by the pressure of the air acting from beneath the same, until there is a drop in the pressure of the receiver which is supplied through the pipe 69, or until an increased pressure on the valve stem from above takes place, or until both these conditions obtain.

The space within the cylinder 84 and below the piston 83 is connected by a pipe 86 with a space wherein there is produced a vacuum when the compressor is unloaded. Thus connection may be made to the suction side of the low pressure cylinder, as for example to the intake 56, so that when the compressor is unloaded, and the pressure in the intake falls below that of the atmosphere, the piston 83 tends to be depressed more or less by the atmospheric pressure acting through an opening 87 in the top of the cylinder 84. The pressure of the piston is therefore added to that of the spring 80, and when the point is reached where this overbalances the receiver pressure on the lower side of the valve 72, the latter will descend, closing the orifice 71 and opening the conduit 73 through the atmospheric vent 79, chamber 78, grooves 76, and escape chamber 75. This releases pressure fluid from above the piston 60, and the latter is caused to lift through the springs 64, and open the unloading valve 58, again loading the compressor. When the compressor is loaded, the pressure in the receiver is again raised, and the piston 83 is forced against the stop screw 85 by the spring 80, reducing the pressure against the valve stem 82 to the amount necessary to hold the valve 72 on its seat until the predetermined pressure is again reached, when the cycle of operations is repeated. The tension of the spring 80 may be regulated by the travel of the piston 83, this being herein accomplished by the use of an adjustable stop screw 88, provided in the bottom of the cylinder 84.

I will now describe the means whereby the controlling device 67, acting conjointly with the air trigger 68, acts to utilize the suction in the intake 56, when the valve 58 is closed, to maintain the latter in its closed position, by causing said suction to be exerted on the under side of the piston 61. The controller 67 comprises a casing 89 having a chamber 90, which is connected by a pipe 91 to the cylinder chamber 63 beneath the piston 61. The casing 89 is also provided with a chamber 92, connected by a pipe 93 with the intake 56. Communication between the chambers 90 and 92 is controlled by a valve 94, herein of the piston type, operating to open and close a port 95 connecting said chambers. By this means, communication between the intake 56 and the piston chamber 63 may be established and interrupted. The chamber 90, and thus the piston chamber 63, may be placed in communication with the atmosphere through a port 96 controlled by a valve 97, herein of the piston type, this valve being herein connected to the valve 94, so that when the port 95 is closed by the valve 94, the port 96 is opened by the valve 97, and vice versa. By this means, after the air pressure within the cylinder chamber 63 has been reduced to a point below atmospheric pressure by being placed in communication with the intake 56, its pressure may be restored to atmospheric pressure by the admission of atmospheric air through the port 96. In order that this restoration may take place gradually, and the interval of time occupied in so doing regulated, the port 96 is herein controlled by a pet-cock 98, by means of which the volume of atmospheric air entering the port may be regulated at will.

The valve 94 is normally closed and the valve 97 is normally opened by a spring 99, and they are moved from their normal positions against the tension of said spring by a piston 100, working in a chamber 101, to which pressure fluid may be admitted by a pipe 102 connected to the cylinder chamber 62. By this means, when the receiver pressure reaches a predetermined point, and the valve 72 opens and supplies pressure fluid to the cylinder chamber 62 to depress the piston 60, a part of the pressure fluid passes from said cylinder chamber through the pipe 102 to the piston chamber 101, thereby causing the piston 100 to operate the valves 94 and 97 to close the piston chamber 63 to the atmosphere, and place it in communication with the intake 56, wherein a vacuum is now established, thus causing the suction to be exerted against the under side of the piston 61, whereby the latter assists the pressure actuated piston 60 in maintaining the intake valve in its closed position until the receiver pressure again drops, and the intake valve opens, whereupon normal conditions will be reëstablished.

Figures 6, 7:
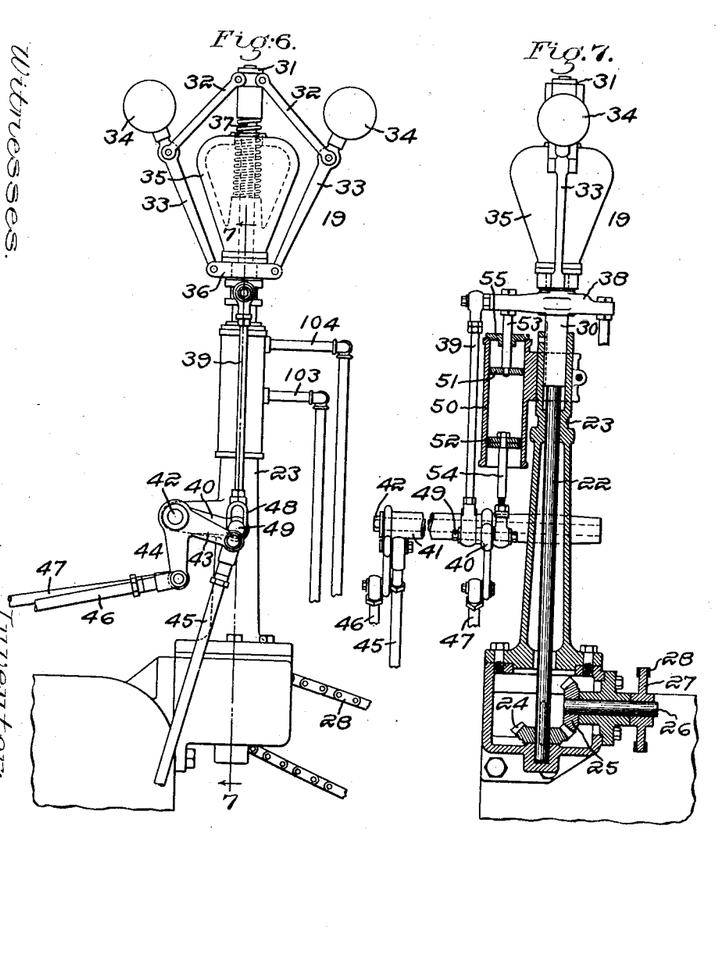
Fig. 6 is an elevation on an enlarged scale of the governor and adjacent parts.
Fig. 7 is a sectional view, partly in elevation, on line 7—7 of Fig. 6, looking toward the left.

I will now describe the connections by means of which the action of the pistons 51 and 52 is controlled, whereby the cutoff is regulated, and the action of the governor modified conjointly with the opening and closing of the intake valve 58. A pipe 103 connected to the chamber in the cylinder 50, intermediate the pistons 51 and 52, is connected to the pipe 86, hereinbefore described leading to the intake 56, whereby when the intake valve 58 closes, and a vacuum is formed in the intake 56, the suction is communicated to the space between said pistons, thereby tending to elevate the piston 52 and depress the piston 51. A pipe 104, connected to the chamber in the cylinder 50, between the piston 51 and the cylinder head 55, leads to the pipe 91 hereinbefore described, and to the chamber 90, whereby the space above the piston 51 may be placed in communication with the intake 56, by way of the pipe 104, pipe 91, chamber 90, port 95, chamber 92, and pipe 93, and whereby the space above the piston 51 may be placed in communication with the atmosphere by way of the pipe 104, the chamber 90, and the port 96, when the valve 94 closes the port 95, and the valve 97 opens the port 96.

The sequence of operations may be briefly stated as follows:—first, unloading; second, shortening the cut-off; third, slowing down the compressor; fourth, speeding it up again to its normal speed; fifth, loading; and sixth, lengthening the cut-off.

Figure 4:
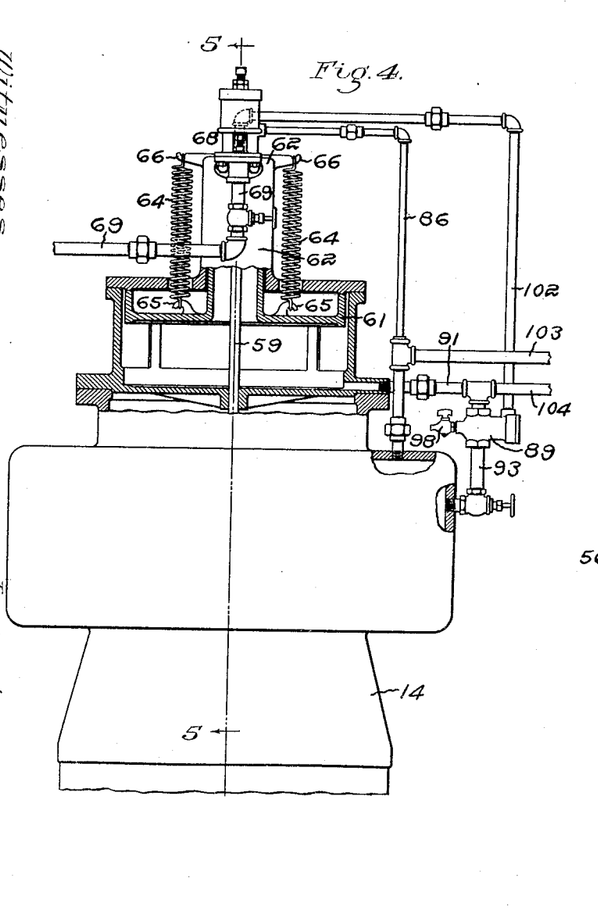
Fig. 4 is an elevation, partly in vertical section, on an enlarged scale, of the intake valve and a part of the controlling apparatus therefor, including the pistons and valve-lifting springs.
Figure 5:
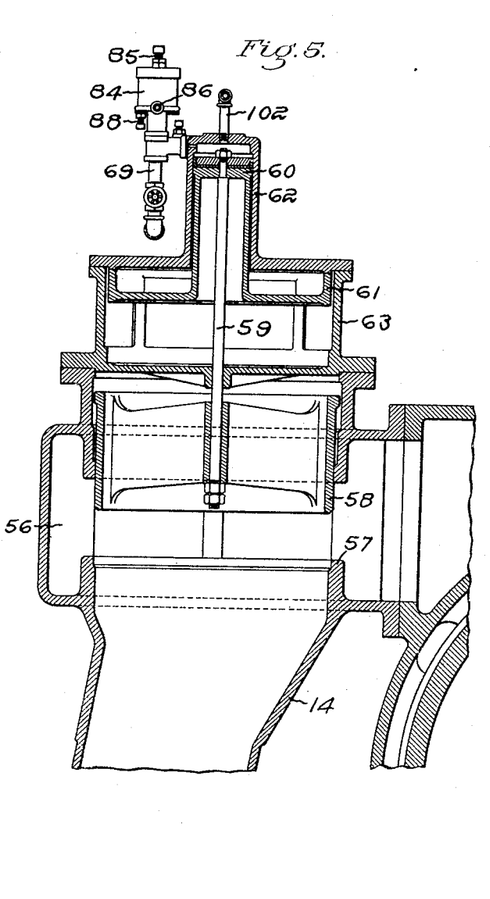
Fig. 5 is a sectional view, partly in elevation, on line 5—5 of Fig. 4, looking toward the left.

Amplifying this brief statement the operations may be described as follows:

*First, unloading.*—When the terminal or receiver pressure reaches a predetermined point, the valve 72 opens and admits air under pressure to the cylinder 62 and to the piston chamber 101, thus causing the pistons 60 and 61 to be forced down against the tension of the springs 64 until the valve 58 is seated, closing the intake opening in the low-pressure air cylinder, and thus unloading the compressor.

*Second, shortening the cut-off.*—As soon as the compressor is unloaded, a vacuum is formed in the compressor intake, and this diminution of pressure is at once effective in the space between the pistons 51 and 52, thus causing the latter to be forced upward by the atmospheric pressure acting against the under side thereof. The upward motion of the piston 52 causes the piston-rod 54 to lift the arm 40, which is connected to and operates the cut-off cams on the steam valve-gear, until the pin 49, sliding in the slot 48, comes in contact with the end of the latter, thus shortening the cut-off the proper amount to keep the compressor running at the same speed it was running before it was unloaded. It should here be noted that the slotted head of the rod 39 is adjustable on the rod, so that the travel of the pin 49 in the slot 48 can be adjusted at its upper position, thus varying the amount the cut-off is shortened, yet without changing the lower position of the pin.

*Third, slowing down the compressor.*— When the air pressure is admitted to the cylinder 62 and to the piston chamber 101, thus causing the pistons 60 and 61 to be forced down against the tension of the springs 64, thus causing the valve 58 to close the intake, and the resultant vacuum in the latter is communicated to the space between the piston 51 and cylinder head 55, and to the under side of the piston 61, the latter being at its lowest position, no action takes place at this time.

The vacuum above the piston 51 being equal to that below the piston, the latter becomes balanced, and therefore the lifting effect of the piston 52 is transferred through the rod 54, pin 49 and rod 39 to the cross-head 38, thus relieving some of the weight the governor has to lift, the result being that the compressor slows down and will continue to run at slow speed as long as the compressor is unloaded.

The pistons 51 and 52, operating under a vacuum, offer no resistance to the proper operation of the governor, as is the case with governors that are controlled by a positive pressure air cylinder, which necessarily interferes with the proper action, due to the displacement of the piston in said cylinder, causing the air pressure to increase and to offer additional resistance to the proper movement of the governor.

The required amount of reduction in the speed of the compressor is obtained by making the area of the piston 51 greater or less according to the amount of weight to be relieved.

*Fourth, speeding the compressor up to its normal speed.*—When the air pressure in the receiver has dropped to a predetermined point, the valve 74 opens and exhausts the air from the cylinder 62, relieving the pressure on the piston 60 and piston 100. There being a previously formed vacuum on the under side of the piston 61, as already described, the valve 58 will still be held on its seat against the resistance of the springs 64.

The pressure being relieved from the piston 100, the spring 99 forces said piston toward the right (Fig. 9), thus opening the orifice 96 and closing the orifice 95. Now the vacuum in the space beneath the piston 61 and in the cylinder 50 above the piston 51 begins to lessen, that is, to approach atmospheric pressure. The speed at which it drops is regulated by the pet-cock 98, as it is necessary that the vacuum should not drop suddenly, but slowly enough to allow the compressor to attain practically full speed before it is loaded. As the vacuum drops the lifting force of the piston 52 becomes reduced and the governor drops, carrying with it the lever 40, thus lengthening the cut-off through its connections to the valve gear so that there is a corresponding increase in the speed of the compressor.

In practice, the area of the piston 61 is made large enough to hold the valve 58 on its seat against the resistance of the springs 64 until the vacuum diminishes to about 2½ inches. When the vacuum is reduced to this point, there is very little lifting power exerted on the governor by the piston 52, and consequently the compressor will again be running at practically full speed.

*Fifth, loading.*—As the vacuum continues to diminish to less than 2½ inches the piston 61 can no longer overcome the tension of the springs 64, and the latter lift the valve 58, thus again loading the compressor.

*Sixth, lengthening the cut-off.*—As soon as the valve 58 is lifted from its seat, the vacuum in the intake of the compressor as well as in the space between the pistons 51 and 52 is broken, thus allowing the piston 52, lever 40, and pin 49 to drop until the latter reaches the lower end of the slot 48, thus lengthening the cut-off to the proper amount so that the compressor will again run at normal speed loaded.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to procure is:—

1. In combination, a compressor having an intake, an unloading valve therein, a compressor driving motor, and means for utilizing a vacuum formed upon closure of said valve to control said motor, said means having provision for relieving said motor of said vacuum control prior to the opening of said valve.

2. In combination, a compressor having an intake, an unloading valve therein, a compressor driving motor, and means for controlling said motor including a governor controlled cut-off mechanism controlled by the movement of said unloading valve, said means having provision for relieving the same from the control of said valve.

3. In combination, a compressor having an intake, an unloading valve therein, a compressor driving motor, automatically acting means for operating said valve, automatically acting means controlled thereby and including a governor controlled cut-off mechanism for thereafter controlling said motor, and means for relieving said last named means from the control of said valve.

4. In combination, a compressor having an intake, an unloading valve therein, a compressor driving motor, and means controlled by terminal pressure for maintaining the motor at a constant speed despite the closure of said valve.

5. In combination, a compressor having an intake, an unloading valve therein, a compressor driving motor, means for maintaining the latter at a constant speed despite the closure of said valve, and means for subsequently reducing the motor speed.

6. In combination, a compressor having an intake, an unloading valve therein, a compressor driving motor, cut-off mechanism therefor, and means for actuating said cut-off mechanism to maintain a constant speed despite the closure of said valve.

7. In combination, a compressor having an intake, an unloading valve therein, a compressor driving motor, cut-off mechanism therefor, means for actuating said cut-off mechanism to maintain a constant speed despite the closure of said valve, and means for thereafter further actuating said cut-off mechanism.

8. In a compressor controlling mechanism, in combination a compressor having an intake, an intake controlling valve, a compressor driving engine, cut-off mechanism therefor, and means responsive to vacuum conditions in the compressor upon closure of said intake valve controlling said cut-off mechanism, said means having provision for relieving said cut-off mechanism of said vacuum control prior to the opening of said intake valve.

9. The combination with a compressor having an intake, and an unloading valve for controlling said intake; of a compressor-driving motor having controlling means; and means controlled by terminal pressure for actuating said unloading valve and thereafter operating said motor controlling means to reduce the motor power supply and subsequently to reduce the motor speed.

10. The combination with a compressor having an intake and an unloading valve for controlling said intake; of a compressor-driving motor having controlling means including cut-off mechanism and an automatic speed-regulating governor controlling the same; and means controlled by terminal pressure for actuating said unloading valve and thereafter operating said governor, said means permitting the return of said governor to normal prior to the return of said unloading valve.

11. The combination with a compressor having an intake and an unloading valve for controlling said intake; of a compressor-driving motor having controlling means including cut-off mechanism and an automatic speed-regulating governor controlling the same; and means controlled by terminal pressure and the pressure in said compressor for controlling said unloading valve and said motor-controlling means, and modifying the action of said governor.

12. The combination with a compressor having an intake, and an unloading valve for controlling said intake; of a compressor-driving motor having cut-off mechanism and a speed governor controlling the same; yielding means tending to open said unloading valve; and means controlled by terminal pressure and the pressure conditions in said compressor for closing the unloading valve and operating said speed governor to reduce the speed of the motor, said means permitting the speed of said motor to be increased prior to the opening of said unloading valve.

13. The combination with a compressor having an intake, and an unloading valve for controlling said intake; of a compressor-driving motor having controlling means; and means controlled by terminal pressure and responsive to the pressure conditions in said compressor for closing said unloading valve and operating said motor-controlling means to reduce successively the power supply and the speed of the motor.

14. The combination with a compressor having an intake and an unloading valve for controlling the same; of a compressor-driving motor; pressure fluid actuated means to cause closing of said unloading valve, and means controlled by said last mentioned means and responsive to changes in pressure conditions in said compressor to reduce the speed of said motor, said means permitting increased motor speed irrespective of pressure conditions in said compressor.

15. The combination with a compressor having an intake and means for controlling the same; of a compressor-driving motor; pressure fluid actuated means to cause said unloading valve to close when the terminal pressure rises to a predetermined point; and means including a pressure fluid actuated member controlled by said last mentioned means and operatively connected to said intake to cause the power supply and the speed of said motor to be successively reduced.

16. In combination, a compressor, an unloading valve therefor, means controlled by terminal pressure for operating said unloading valve, a compressor driving engine, cut-off mechanism therefor, and means for adjusting said cut-off mechanism upon movement of said valve to unload said compressor and prior to movement thereof to load said compressor.

17. In combination, a compressor having an intake, an unloading valve in said intake, a compressor driving engine, cut-off mechanism therefor, and controlling mechanism for said cut-off mechanism controlled by terminal pressure and responsive to changes in pressure in said intake.

18. In combination, a compressor having an intake, means for unloading said compressor and producing a vacuum in said intake, compressor driving mechanism, cut-off mechanism thereon, and mechanism for shortening said cut-off mechanism controlled by terminal pressure and connected to said intake.

19. In combination, a compressor having an intake, an unloading valve in said intake, a compressor driving engine, cut-off mechanism therefor, and controlling mechanism for said cut-off mechanism controlled by terminal pressure and responsive to changes in pressure in said intake after the closure of said valve.

20. In combination, a compressor having an intake, an unloading valve in said intake, means controlled by terminal pressure for closing said valve, means normally tending to open said valve, and means actuated by atmospheric pressure and connected to said intake for holding said valve closed.

21. In combination, a compressor having an intake, an unloading valve in said intake, means responsive to terminal pressure for closing said valve, a compressor driving engine, cut-off mechanism therefor, and automatic controlling mechanism for said cut-off mechanism responsive to changes in the pressure conditions in said intake.

22. In combination, a compressor having an intake, means for producing a vacuum in said intake, a compressor driving engine, means responsive to the pressure conditions in said intake for shortening the cut-off of said engine, and means for thereafter automatically slowing down said compressor.

23. In combination, a compressor having an intake, means for unloading said compressor and producing a vacuum in said intake, a compressor driving engine, means for shortening the cut-off thereof responsive to terminal pressure and connected to said intake, and means for adjusting the amount of shortening of the cut-off.

24. In combination, a compressor having an intake, means for producing a vacuum therein, a compressor driving engine, cut-off mechanism therefor, and means responsive to the pressure conditions in said intake for shortening said cut-off and slowing down the compressor.

25. In combination, a compressor having an intake, means for producing a vacuum therein, a compressor driving engine, cut-off mechanism therefor, and means responsive to the pressure conditions in said intake for shortening said cut-off and thereafter automatically speeding up said compressor and lengthening said cut-off.

26. In combination, a compressor having an intake, means for producing a vacuum therein, a compressor driving engine, cut-off mechanism therefor, means controlled by terminal pressure and responsive to the pressure conditions in said intake for shortening said cut-off and slowing down the compressor, and automatically acting means operable upon a drop in terminal pressure for speeding up said compressor, and lengthening said cut-off.

27. In combination, a compressor having an intake, means responsive to terminal pressure for unloading said compressor and creating a vacuum in said intake, a compressor driving engine having an adjustable cut-off, means responsive to the pressure conditions in said intake for shortening said cut-off, coöperating automatically acting means for slowing down the compressor, means responsive to a drop in terminal pressure for speeding up said compressor, and means for thereafter automatically loading said compressor and breaking the vacuum in said intake.

28. In combination, a compressor having an intake, means responsible to terminal pressure for unloading said compressor and creating a vacuum in said intake, a compressor driving engine, means responsive to the pressure in said intake for shortening the engine cut-off, coöperating automatically acting means for slowing down the compressor, means responsive to a drop in the terminal pressure for speeding up said compressor, means for thereafter automatically loading said compressor and breaking the vacuum in said intake, and coöperating means for thereafter lengthening the cut-off.

29. In combination, a compressor having an intake, an unloading valve controlling said intake, said valve including a plurality of pressure surfaces movable in a plurality of cylinders, a means for supplying one of said surfaces with terminal pressure, and means for placing the other in communication with the intake.

30. In combination, a compressor having an intake, an unloading valve controlling said intake, said valve including a plurality of pressure surfaces movable in a plurality of cylinders, means for supplying terminal pressure to one of said surfaces, means for connecting the other to said intake, and means for controlling said last mentioned connection by terminal pressure.

31. In combination, a compressor having an intake, an unloading valve controlling said intake, a driving motor for said compressor, cut-off mechanism therefor, controlling means for said cut-off mechanism including a movable piston, and means for creating a vacuum at one side of said piston when said valve is closed and for relieving the same prior to the opening of said valve.

32. In combination, a compressor having an intake, an unloading valve controlling said intake, a driving motor for said compressor, cut-off mechanism therefor, controlling means for said cut-off mechanism including a plurality of movable pistons, and means for creating a vacuum at one side of one of said pistons and between the same.

33. In combination, a compressor, a driving engine, engine controlling mechanism including cut-off mechanism and a speed governor, means responsive to terminal pressure conditions for actuating said cut-off mechanism independently of said governor, and means for subsequently actuating said governor.

34. In combination, a compressor, a driving engine, engine controlling mechanism including cut-off mechanism and a speed governor, and means controlled by terminal pressure whereby at a predetermined pressure said cut-off mechanism may be actuated independently of said governor and said governor subsequently actuated to reduce the speed of said engine and compressor.

35. In combination, a compressor, an unloading valve therefor, a driving motor for said compressor, cut-off mechanism for said motor, a speed governor, and means responsive to terminal pressure for initially operating said cut-off mechanism and subsequently operating said governor to reduce the speed.

36. In combination, a compressor, an unloading valve therefor, a driving motor for said compressor, cut-off mechanism for said motor, a speed governor, and means responsive to terminal pressure and to pressure conditions in said compressor arising from closure of said unloading valve for initially operating said cut-off mechanism and subsequently operating said governor to reduce the speed.

37. In combination, a compressor, a compressor driving engine, a centrifugal governor on said engine, cut-off mechanism therefor, operative connections between said governor and cut-off mechanism including a pin and rod, one of the same being movable relative to the other, and means for imparting movement to one of said last mentioned elements and thereafter moving the same together to control said compressor.

38. In combination, a compressor, a driving engine therefor, a centrifugal engine governor, a cylinder, a piston connected to said governor and movable in said cylinder, a rock shaft, cut-off mechanism on said engine, a second piston movable in said cylinder, operative connections between said pistons and said governor and cut-off mechanism, and means connected to said compressor for regulating the position of said pistons in said cylinder.

39. The combination with a compressor having an intake and means for controlling the same; of a compressor-driving motor; pressure fluid actuated means to cause said unloading valve to close when the terminal pressure rises to a predetermined point; pressure fluid actuated means controlled by said last mentioned means and connected to said intake to cause the power supply and the speed of said motor to be successively reduced; and means to cause the speed of said motor to be increased and the unloading valve to open when the terminal pressure becomes reduced to the predetermined point and thereafter to increase the power supply to the motor.

40. The combination with a compressor having an intake and an unloading valve for controlling the same; of a compressor-driving motor; and pressure fluid actuated instrumentalities to control said unloading valve and the speed of said motor, said instrumentalities including motor-controlling means connected to said intake; unloading valve controlling means, and means to cause said valve controlling means to close said valve, and said motor-controlling means successively to reduce the power supply to and the speed of said motor when the terminal pressure rises to a predetermined point.

41. The combination with a compressor having an intake and an unloading valve for controlling the same; of a compressor-driving motor; and pressure fluid actuated instrumentalities to control said unloading valve and the speed of said motor, said instrumentalities including motor-controlling means connected to said intake, unloading valve controlling means, means to cause said valve controlling means to close said valve, and said motor-controlling means to reduce the speed of said motor when the terminal pressure rises to a predetermined point, and means to cause said motor controlling means to increase the speed of said motor and to cause said valve controlling means to close said valve when the terminal pressure becomes diminished to the predetermined point.

42. The combination with a compressor having an intake and an unloading valve for controlling the same; of a compressor driving motor; and pressure fluid actuated instrumentalities to control said unloading valve and the speed of said motor, said instrumentalities including a pressure cylinder having a piston working therein, a vacuum cylinder having a piston working therein, means effective upon the increase of terminal pressure to a predetermined point to supply fluid under pressure to said pressure cylinder to cause said valve to be closed, means rendered effective by such increase of terminal pressure to cause a diminution of pressure within said vacuum cylinder to cause said valve to be held in its closed position, means rendered effective by such diminution of pressure to reduce the speed of said motor, and means rendered effective by reduction of terminal pressure to said predetermined point to cause the pressure fluid to be exhausted from said pressure cylinder and to cause a restoration of the normal pressure within said vacuum cylinder and to cause the reëstablishment of the normal speed of said motor, whereby said valve is closed and the compressor restored to normal running conditions.

43. An unloading apparatus for steam-driven compressors comprising in combination, means for causing the compressor to unload at a predetermined terminal pressure; means to cause the engine cut-off to be shortened; means to cause the speed of the compressor to be diminished; means to cause the compressor to be speeded up to normal speed when the terminal pressure drops to the predetermined point; means for thereafter causing the compressor to be loaded again; and means for causing the engine cut-off to be lengthened.

44. The combination with a compressor having an intake and an unloading valve for controlling said intake; a compressor-driving engine having valve mechanism and a governor for controlling the valve cut-off; a governor and cut-off controlling cylinder having two pistons therein, one connected to the governor to modify its action and the other connected to the valve-mechanism to change its cut-off, said pistons having a space therebetween communicating with said intake, one end of said cylinder being closed to form a chamber between the closed end and the first-mentioned piston, and the other end of said cylinder being in communication with the atmosphere; yielding means tending to open said unloading valve; pressure fluid means for closing said unloading valve, including a pressure cylinder having a piston working therein and a vacuum cylinder having a piston working therein, the last two mentioned pistons being connected to each other and to said unloading valve; a controlling valve for controlling communication between said vacuum cylinder, said chamber and the atmosphere; a second controlling valve for controlling communication between said vacuum cylinder, said chamber and the compressor intake; yielding means tending to open the first-mentioned controlling valve and to close the second-mentioned controlling valve; pressure fluid means including a controlling cylinder and piston working therein for closing the first-mentioned controlling valve and opening the second-mentioned controlling valve; a valve for controlling the admission of fluid at terminal pressure to said pressure cylinder and to said controlling cylinder; a valve for placing said pressure cylinder and said controlling cylinder in communication with the atmosphere, the last two mentioned valves being connected whereby when one is opened the other is closed; yielding means tending to hold the last two mentioned valves in position, the one cutting off the admission of terminal pressure fluid to said pressure cylinder and to said controlling cylinder and the other admitting atmospheric air to said pressure cylinder and said controlling cylinder; and pressure fluid means including a cylinder and a piston working therein for varying the action of the last-mentioned yielding means, one end of the last-mentioned piston being subject to atmospheric pressure, and the other end being subject to intake pressure.

45. In combination, a compressor, unloading means therefor, means controlled by terminal pressure for controlling the operation of said unloading means to unload said compressor, and means controlled by said first named controlling means for controlling the operation of said unloading means to load said compressor.

46. In combination, a compressor, unloading means therefor, a compressor driving motor, means controlled by terminal pressure for controlling the operation of said unloading means to unload said compressor, means controlled by said first named controlling means for controlling the operation of said unloading means to load said compressor, and means controlled by said last named means for controlling said motor.

47. In combination, a compressor having an intake, an unloading valve therein, operating means for said unloading valve controlled by terminal pressure to close said valve and by the pressure in said intake to hold said valve closed, means controlled by terminal pressure for admitting said pressure to said operating means, and means controlled by said last named means for connecting said operating means with said intake or with the atmosphere.

48. In combination, a compressor having an intake, a normally open unloading valve therein, a cylinder, a piston therein connected to said unloading valve, means operated by terminal pressure for admitting said pressure to one end of said cylinder to cause said piston to close said unloading valve, and means controlled by said last named means for placing the opposite end of said cylinder in communication with said intake to hold said valve closed or for slowly venting the same to the atmosphere to permit said valve to open.

49. In combination, a compressor, unloading means therefor, a compressor driving motor, means for controlling said motor, and mechanism coöperating with said unloading means and controlling means and controlled by terminal pressure and by pressure conditions arising from unloading said compressor for automatically causing, successively, unloading of said compressor, reduction of the speed of said motor, increase of the speed of said motor, and after an appreciable interval loading of said compressor, in the order named.

50. In combination, a compressor, a receiver therefor, means responsive to receiver pressure for shutting off the air supply to said compressor, a compressor driving engine, means for controlling said engine, means responsive to receiver pressure for controlling said controlling means, and means responsive to pressure conditions arising from shutting off the air supply to said compressor for exercising an additional control upon said engine controlling means.

51. In combination, a compressor, a receiver therefor, means responsive to receiver pressure for shutting off the air supply to said compressor, a compressor driving engine, cut-off valve mechanism therefor, means responsive to pressure conditions arising from shutting off the air supply to said compressor for adjusting said cut-off valve mechanism, and means responsive to receiver pressure for also controlling said cut-off valve mechanism.

52. In an apparatus of the character described, the combination comprising a compressor having an intake, an intake controlling valve, a compressor driving engine provided with fluid distributing means, and means responsive to changes in pressure conditions in said compressor upon closure of said intake controlling valve for controlling said fluid distributing means to control the running speed of said engine.

53. In an apparatus of the character described, the combination comprising a compressor having an intake, an intake controlling valve, a compressor driving engine provided with fluid distributing means, and means responsive to changes in pressure conditions in said compressor upon closure of said intake controlling valve for controlling said fluid distributing means to reduce the running speed of said engine.

54. In an apparatus of the character described, the combination comprising a compressor having an intake, an intake controlling valve, a compressor driving engine provided with fluid distributing means, and means responsive to changes in pressure conditions in said compressor upon closure of said intake controlling valve for controlling said fluid distributing means to increase the running speed of said engine.

55. In an apparatus of the character described, the combination comprising a compressor having an intake, an intake controlling valve, a compressor driving engine provided with fluid distributing means, and means responsive to changes in pressure conditions in said compressor upon operation of said intake controlling valve for controlling said fluid distributing means to control the running speed of said engine.

56. In an apparatus of the character described, the combination comprising a compressor having an intake, an intake controlling valve, a compressor driving engine, cut-off mechanism therefor, and means responsive to vacuum conditions in the compressor upon closure of said intake valve for controlling said cut-off mechanism.

57. In an apparatus of the character described, the combination comprising a compressor having an intake, an intake controlling valve, pressure responsive means for controlling the same, a compressor driving engine provided with fluid distributing means, and means responsive to the pressure conditions resulting from the closure of said valve for controlling said fluid distributing means and thereby the running speed of said engine.

58. In an apparatus of the character described, the combination comprising a compressor having an intake, an intake controlling valve, pressure responsive means for controlling the same, a compressor driving engine having cut-off mechanism, and means responsive to changes in pressure conditions arising from closure of said intake controlling valve for controlling said cut-off mechanism.

59. In an apparatus of the character described, the combination comprising a compressor having an intake, an intake controlling valve, means for controlling the same, a compressor driving engine, valve mechanism therefor having means for providing a variable cut-off, a speed governor controlling said valve mechanism, and means responsive to changes in pressure conditions arising from the closure of said intake valve for controlling said governor mechanism.

60. In an apparatus of the character described, the combination comprising a compressor having an intake controlling valve, a compressor driving engine, cut-off mechanism therefor, and means responsive to vacuum conditions in the compressor upon closure of said intake valve for effecting a delayed controlling of said cut-off mechanism.

61. In combination, a compressor, and driving means therefor of the expansible chamber type, comprising motive fluid distributing mechanism and a plurality of means sequentially controlling said distributing mechanism and controlled by compressor discharge pressure variations to vary the speed of said compressor.

62. In combination with a compressor, a compressor driving engine, and means for controlling the speed of said driving engine comprising a plurality of means whose operation is controlled by compressor discharge pressure in excess of a predetermined desired discharge pressure.

63. In combination with a compressor, a compressor driving engine, and means successively operable to govern the speed of said engine, said means being controlled by compressor discharge pressure when the latter is in excess of a predetermined desired discharge pressure.

64. In combination with a compressor having an intake, an intake controlling valve, controlling means for said intake controlling valve, a compressor driving engine, and means for controlling the speed of said engine comprising mechanism responsive to the pressure developed by said compressor in excess of a predetermined amount and mechanism responsive to changes in pressure conditions after closure of the compressor intake controlling valve.

In testimony whereof, I have signed my name to this specification, in the presence of two subscribing witnesses.

WADE H. WINEMAN.

Witnesses:
ALBERT F. PIPENHAGEN,
FRANK A. HALLECK.

It is hereby certified that in Letters Patent No. 1,394,802, granted October 25, 1921, upon the application of Wade H. Wineman, of Chicago, Illinois, for an improvement in "Unloading Apparatus for Compressors," errors appear in the printed specification requiring correction as follows: Page 5, line 92, claim 8, after the word "combination" insert a comma; page 7, line 25, claim 28, for the word "responsible" read *responsive;* and that the said Letters Patent should be read with these corrections therein that the same may conform to the record of the case in the Patent Office.

Signed and sealed this 13th day of December, A. D., 1921.

[SEAL.]

KARL FENNING,
*Acting Commissioner of Patents.*